United States Patent
Li et al.

(10) Patent No.: US 9,785,628 B2
(45) Date of Patent: Oct. 10, 2017

(54) SYSTEM, METHOD AND COMPUTER-READABLE STORAGE DEVICE FOR PROVIDING CLOUD-BASED SHARED VOCABULARY/TYPING HISTORY FOR EFFICIENT SOCIAL COMMUNICATION

(75) Inventors: Dong Li, Beijing (CN); Xi Chen, Beijing (CN); Yoshiharu Sato, Kanagawa (JP); Keita Ooi, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 653 days.

(21) Appl. No.: 13/249,233

(22) Filed: Sep. 29, 2011

(65) Prior Publication Data

US 2013/0085747 A1    Apr. 4, 2013

(51) Int. Cl.
| | |
|---|---|
| G06F 17/00 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |
| G06F 17/30 | (2006.01) |
| G06F 3/00 | (2006.01) |
| G06F 3/048 | (2013.01) |
| G06F 7/00 | (2006.01) |
| G06F 15/16 | (2006.01) |
| G10L 15/00 | (2013.01) |
| G10L 15/26 | (2006.01) |
| G10L 21/06 | (2013.01) |
| G10L 15/06 | (2013.01) |

(Continued)

(52) U.S. Cl.
CPC .................. *G06F 17/2735* (2013.01)

(58) Field of Classification Search
CPC .......... G06F 17/30864; G06F 17/3071; G06F 17/3064; G06F 9/4448; G06F 3/0481; G06F 17/241; H04L 29/08072; G06Q 10/10; G06Q 10/107
USPC ............... 707/708, 737, 707, 706, 766, 723; 715/703, 764, 233, 708, 773, 758, 259, 715/816; 709/204, 203, 271, 207, 206; 434/322, 185; 704/10
See application file for complete search history.

(56) References Cited

U.S. PATENT DOCUMENTS 7,827,165 B2 * 11/2010 Abernethy et al. ........... 707/708
8,161,536 B1 *  4/2012 Subramaniam et al. ......... 726/7

(Continued)

OTHER PUBLICATIONS

Juwel Rana et al. Enriching and Simplifying Communication by Social Prioritization.—Published Date: 2010. 2010 International Conference on Advances in Social Networks Analysis and Mining. http://acadmedia.wku.edu/Zhuhadar/nikhile/ASONAM-2010/ASONAM-62.pdf.

(Continued)

*Primary Examiner* — Anne Thomas-Homescu
(74) *Attorney, Agent, or Firm* — Merchant & Gould P.C.

(57) ABSTRACT

An input method editor (IME) is associated with a local user. Memory stores local data and a processor, coupled to the memory, is configured to receive input from a local, first user, obtain shared data associated with at least a remote, second user from a remote server and generate prediction candidates and conversion candidates based on the input provided by the local, first user and correlation of the input and the obtained shared data.

11 Claims, 11 Drawing Sheets

(51) Int. Cl.
G10L 15/04 (2013.01)
G10L 21/00 (2013.01)
G10L 25/00 (2013.01)

(56) References Cited

U.S. PATENT DOCUMENTS

| | | | | |
|---|---|---|---|---|
| 8,340,726 | B1* | 12/2012 | Fujisaki | H04M 19/04 345/168 |
| 8,423,353 | B2* | 4/2013 | Itakura | G06F 17/2735 704/1 |
| 8,532,994 | B2* | 9/2013 | Malegaonkar | G10L 15/07 704/257 |
| 2002/0182571 | A1* | 12/2002 | McCormick | G09B 19/06 434/157 |
| 2003/0130976 | A1* | 7/2003 | Au | 706/55 |
| 2003/0163366 | A1* | 8/2003 | Taft | 705/12 |
| 2004/0201607 | A1* | 10/2004 | Mulvey et al. | 345/708 |
| 2005/0114770 | A1* | 5/2005 | Sacher | G06F 17/276 715/261 |
| 2005/0251743 | A1* | 11/2005 | Ishikawa | G06F 17/2735 715/259 |
| 2005/0283724 | A1* | 12/2005 | Griffin | G06F 17/2735 715/259 |
| 2006/0100856 | A1* | 5/2006 | Kang | G06F 17/2735 704/9 |
| 2006/0152496 | A1* | 7/2006 | Knaven | G06F 3/023 345/172 |
| 2006/0163337 | A1* | 7/2006 | Unruh | G06F 3/0237 235/145 A |
| 2006/0173683 | A1* | 8/2006 | Roth | G10L 15/183 704/251 |
| 2006/0230350 | A1* | 10/2006 | Baluja | G06F 3/0237 715/700 |
| 2006/0282258 | A1* | 12/2006 | Tsuzuki | G06F 17/30731 704/10 |
| 2007/0005336 | A1* | 1/2007 | Pathiyal et al. | 704/2 |
| 2007/0100619 | A1* | 5/2007 | Purho | G06F 3/0237 704/239 |
| 2007/0112554 | A1* | 5/2007 | Goradia | G06F 17/2735 704/4 |
| 2007/0198534 | A1* | 8/2007 | Hon et al. | 707/10 |
| 2007/0226649 | A1* | 9/2007 | Agmon | G06F 17/276 715/816 |
| 2007/0280463 | A1* | 12/2007 | Kouchri et al. | 379/201.01 |
| 2008/0059897 | A1* | 3/2008 | Dilorenzo | 715/764 |
| 2008/0127292 | A1* | 5/2008 | Cooper et al. | 726/1 |
| 2008/0147790 | A1* | 6/2008 | Malaney et al. | 709/203 |
| 2008/0154915 | A1* | 6/2008 | Flake et al. | 707/10 |
| 2008/0195388 | A1* | 8/2008 | Bower | G06F 3/0237 704/243 |
| 2008/0243834 | A1* | 10/2008 | Rieman | G06F 17/276 |
| 2008/0281583 | A1* | 11/2008 | Slothouber | G06F 17/30867 704/10 |
| 2009/0019002 | A1* | 1/2009 | Boulis | G06F 17/3064 |
| 2009/0019395 | A1* | 1/2009 | Radom | G06F 3/0237 715/816 |
| 2009/0077130 | A1* | 3/2009 | Abernethy, Jr. | G06F 17/2735 |
| 2009/0083028 | A1* | 3/2009 | Davtchev | G06F 17/273 704/9 |
| 2009/0164897 | A1* | 6/2009 | Amer-Yahia et al. | 715/703 |
| 2009/0179863 | A1* | 7/2009 | Tahir | G06F 3/0237 345/169 |
| 2009/0204392 | A1* | 8/2009 | Ishikawa | G10L 15/063 704/10 |
| 2009/0228482 | A1* | 9/2009 | Ye | G06F 17/30864 |
| 2009/0228825 | A1* | 9/2009 | Van Os | G06F 3/0488 715/780 |
| 2009/0241102 | A1* | 9/2009 | Wang | G06F 17/2735 717/171 |
| 2009/0241104 | A1* | 9/2009 | Amiga | G06F 8/65 717/174 |
| 2009/0249198 | A1* | 10/2009 | Davis | G06F 17/276 715/261 |
| 2009/0254817 | A1* | 10/2009 | Dreyfus | G06F 17/2735 715/257 |
| 2009/0281789 | A1* | 11/2009 | Waibel | G06F 17/2735 704/3 |
| 2009/0327880 | A1* | 12/2009 | Ide | G06F 17/276 715/261 |
| 2010/0010968 | A1* | 1/2010 | Redlich | G06F 17/30672 707/E17.014 |
| 2010/0042593 | A1* | 2/2010 | Matveenko et al. | 707/3 |
| 2010/0070921 | A1* | 3/2010 | Rieman | G06F 15/16 715/811 |
| 2010/0114887 | A1* | 5/2010 | Conway et al. | 707/737 |
| 2010/0120002 | A1* | 5/2010 | Chang et al. | 434/185 |
| 2010/0153880 | A1* | 6/2010 | Dinn | 715/816 |
| 2010/0205416 | A1* | 8/2010 | Lanner et al. | 713/1 |
| 2010/0231523 | A1* | 9/2010 | Chou | 345/171 |
| 2010/0250239 | A1* | 9/2010 | Itakura | G06F 17/30011 704/10 |
| 2010/0250526 | A1* | 9/2010 | Prochazka et al. | 707/723 |
| 2010/0266999 | A1* | 10/2010 | Follansbee et al. | 434/322 |
| 2010/0268534 | A1* | 10/2010 | Kishan Thambiratnam | G10L 15/07 704/235 |
| 2010/0316980 | A1* | 12/2010 | Pazushko | 434/157 |
| 2010/0318903 | A1* | 12/2010 | Ferren | 715/259 |
| 2011/0055256 | A1* | 3/2011 | Phillips et al. | 707/769 |
| 2011/0066941 | A1* | 3/2011 | Chipchase et al. | 715/716 |
| 2011/0087956 | A1* | 4/2011 | Sherman et al. | 715/233 |
| 2011/0125839 | A1* | 5/2011 | Cloutier | G06Q 10/10 709/204 |
| 2011/0136542 | A1* | 6/2011 | Sathish | 455/566 |
| 2011/0145269 | A1* | 6/2011 | Kraftsow et al. | 707/766 |
| 2011/0161144 | A1* | 6/2011 | Mizuguchi | G06F 17/2775 705/14.4 |
| 2011/0173204 | A1* | 7/2011 | Murillo et al. | 707/741 |
| 2011/0202624 | A1* | 8/2011 | Najm | 709/207 |
| 2011/0257977 | A1* | 10/2011 | Greenberg et al. | 704/271 |
| 2011/0280382 | A1* | 11/2011 | Mairs | G06F 17/276 379/93.01 |
| 2011/0307241 | A1* | 12/2011 | Waibel et al. | 704/2 |
| 2011/0319139 | A1* | 12/2011 | Kondo | G06F 3/04886 455/566 |
| 2012/0041903 | A1* | 2/2012 | Beilby et al. | 706/11 |
| 2012/0053935 | A1* | 3/2012 | Malegaonkar | G10L 15/07 704/235 |
| 2012/0059884 | A1* | 3/2012 | Rothschild | 709/206 |
| 2012/0066309 | A1* | 3/2012 | Yuki et al. | 709/204 |
| 2012/0072404 | A1* | 3/2012 | Murphy et al. | 707/706 |
| 2012/0151335 | A1* | 6/2012 | Lehto | 715/259 |
| 2012/0173628 | A1* | 7/2012 | Briere et al. | 709/204 |
| 2012/0331064 | A1* | 12/2012 | Deeter | G06Q 50/01 709/206 |
| 2013/0006803 | A1* | 1/2013 | Oskolkov et al. | 705/26.8 |
| 2013/0018967 | A1* | 1/2013 | Gannu et al. | 709/206 |
| 2013/0046544 | A1* | 2/2013 | Kay | G06F 3/04883 704/275 |
| 2013/0047099 | A1* | 2/2013 | Markman et al. | 715/758 |
| 2013/0179155 | A1* | 7/2013 | Tinkler | 704/10 |
| 2013/0262486 | A1* | 10/2013 | O'Dell | G06F 17/2735 707/755 |
| 2014/0082104 | A1* | 3/2014 | Mann | 709/206 |
| 2014/0164977 | A1* | 6/2014 | Spetalnick | 715/773 |
| 2014/0250195 | A1* | 9/2014 | Capper et al. | 709/206 |

OTHER PUBLICATIONS

Avaré Stewart et al. Cross-Tagging for Personalized Open Social Networking—Jun. 29-Jul. 1, 2009. HT '09 Proceedings of the 20th ACM conference on Hypertext and hypermedia. http://www.l3s.de/web/upload/documents/1/Cross-tagging_for_personalized_Open_Social_Networking.pdf.

(56) References Cited

OTHER PUBLICATIONS

Qiaozhu Mei et al. Automatic Web Tagging and Person Tagging Using Language Models—Oct. 2008 ADMA '08: Proceedings of the 4th international conference on Advanced Data Mining and Applications. http://users.soe.ucsc.edu/~yiz/papers/c15-adma08-2.pdf.

* cited by examiner

SYSTEM, METHOD AND COMPUTER-READABLE STORAGE DEVICE FOR PROVIDING CLOUD-BASED SHARED VOCABULARY/TYPING HISTORY FOR EFFICIENT SOCIAL COMMUNICATION

FIELD OF THE INVENTION

This disclosure relates in general to a method for providing a shared vocabulary for social communication, and more particularly to a system, method and computer-readable storage device for providing cloud-based shared vocabulary/typing history for efficient social communication.

BACKGROUND

Social network services (SNS) continue to become more and more popular in people's daily communication. People share ideas, activities, events, and interests using social communication tools such as MESSENGER, FACEBOOK, TWITTER, microblog, forum, etc. For East Asian languages, people use an IME (input method editor) to type text into the social network services. An input method editor is an operating system component or program that allows users to enter characters and symbols not found on their input device. An IME is a tool which converts the phonetic of a word, typed on a standard keyboard, into East Asian characters. For example, the most common method of typing Chinese is to enter pinyin directly, which the IME will then convert to characters. Pinyin is a system transcribing Chinese into English, wherein the sounds of Mandarin are represented using the western (Roman) alphabet. Thus, once the phonetic pinyin spelling is entered, the IME uses at least one dictionary and statistical language models to select a conversion results given the user's phonetic input. The dictionary and statistical language model is based on a collection of language text pieces representing the whole range of the target language in statistically unbiased manner, and which is selected according to external criteria to represent, as far as possible, the desired language to thereby cover the commonly used words and text. Unfortunately, IME does not adapt to the vocabulary that people often use in the SNS such as film or book names, domain terms, product names, and people names. Many of these words may be completely new. Thus, users may not get the expected words in their top IME candidate list. This presents a problem especially in social communication tools such as IM because users want to type fast and efficiently. In addition, users want suggestions about the words their community uses when they type part of the phonetic.

Currently to compensate, the IME learns the words frequently used by each user of the system and builds a personalized dictionary. However, as social communication becomes more and more popular, it is tedious for users to constantly add new terms to their own personal vocabulary. For example, when two users communicate, they each have their own personal IME dictionary. Thus, when a first user enters a new term, their personal vocabulary is updated so the IME will recognize the new term from then on. Yet, when the second person uses the same term in the communication thread, their IME converts the term incorrectly, thereby requiring correction of the conversion and updating their personal vocabulary.

Accordingly, there is a need for a system, method and computer-readable storage device for providing cloud-based shared vocabulary/typing history for efficient social communication.

SUMMARY OF THE INVENTION

To overcome the limitations described above, and to overcome other limitations that will become apparent upon reading and understanding the present specification; embodiments for a system, method and computer-readable storage device for providing cloud-based shared vocabulary/typing history for efficient social communication are disclosed.

The above-described problems are solved by leveraging the cloud service to get users shared vocabulary/typing history, and utilizing suggested web dictionaries for accurate prediction/conversion resources for IME. In the past, the IME of the first user only learns from the typing history of the first user, and the IME of the second user only learns from the typing history of the second user. In contrast, according to an embodiment, the first user and the second user share the same typing history and IME resources including dictionaries.

In one embodiment, a communication device is disclosed. The communication device includes memory for storing data associated with users and a processor, coupled to the memory, the processor configured for receiving input data from at least a first user, processing at least one dictionary updated by information provided to a server by at least a second user related to the first user for updating the at least one dictionary and generating prediction candidates for converting the received input data to language characters by correlating the received input from the first user to entries in the dictionary updated by information from the at least second user related to the first user.

In another embodiment, a system for sharing between friends a dictionary used to generate prediction candidates for converting user input data to language characters is disclosed. The system includes a first user device for receiving input data from a first user, a second user device for receiving input data from a second user, a dictionary shared by at least the first user and the second user and a server, for hosting the dictionary shared by at least the first user and the second user, wherein the first user device updates the dictionary shared by at least the first user and the second user based on input by the first user and uploads the updated dictionary to the server for access by the second user.

In another embodiment, a system for predicting candidates associated with a microblog is disclosed. The system includes a microblog content server receiving posting input from a plurality of microblog users, a hot topics extractor, coupled to the microblog content server, for extracting hot topics from the posting input receives from the plurality of microblog users and a communication device, coupled to the hot topics extractor, for retrieving the hot topics extracted by the hot topics extractor and generating a hot topics dictionary from the retrieved hot topics, wherein the communication device receives input from a user and generates prediction candidates for converting the received input data to language characters by correlating the received input from to entries in the hot topics dictionary.

In another embodiment, a system for sharing language dictionaries among friends is discloses. This system includes a first user communication device for updating a first dictionary for use in generating prediction candidates in response to input from a first user operating the first user communication device, a dictionary service system, coupled to user communication devices including the first user communication device, for receiving at least the first dictionary and for authorizing the at least first dictionary for sharing, a social update service interface, coupled to the dictionary service system, for receiving the at least one dictionary after the first user is authorized by the dictionary service system for sharing the first dictionary and for providing a link associated with the at least one dictionary to a second user related to the first user through the dictionary service system and a second user communication device, coupled to the social update service interface, the second user communication device receiving input data from the second user, receiving the link associated with the at least one dictionary and downloading the at least one dictionary associated with the link, the second user communication device further generating prediction candidates for converting the received input data from the second user to language characters by correlating the received input from the second user to entries in the at least one dictionary associated with the link downloaded from the social update service interface upon activation of the link.

In another embodiment, a computer-readable storage medium, including executable instructions which, when executed by a processor, provides cloud-based shared data for efficient social communication is disclosed. The processor provides cloud-based shared data by receiving input data from at least a first user, processing at least one dictionary updated by information provided to a server by at least a second user related to the first user for updating the at least one dictionary and generating prediction candidates for converting the received input data to language characters by correlating the received input from the first user to entries in the dictionary updated by information from the at least second user related to the first user.

In another embodiment, a method for providing cloud-based shared data for efficient social communication is disclosed. The method includes receiving input data from at least a first user, processing at least one dictionary updated by information provided to a server by at least a second user related to the first user for updating the at least one dictionary and generating prediction candidates for converting the received input data to language characters by correlating the received input from the first user to entries in the dictionary updated by information from the at least second user related to the first user.

These and various other advantages and features of novelty are pointed out with particularity in the claims annexed hereto and form a part hereof. However, for understanding the disclosed embodiments, the advantages, and the objects obtained, reference may be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments are directed to cloud-based shared vocabulary/typing history for providing efficient social communication. By leveraging the cloud service to get users shared vocabulary/typing history, and utilizing suggested web dictionaries for accurate prediction/conversion resources for IME, more efficient social communication may be provided. In the past, the IME of the first user only learns from the typing history of the first user, and the IME of the second user only learns from the typing history of the second user. In contrast, according to an embodiment, the first user and the second user share the same typing history and IME resources including dictionaries.

Figure 1:
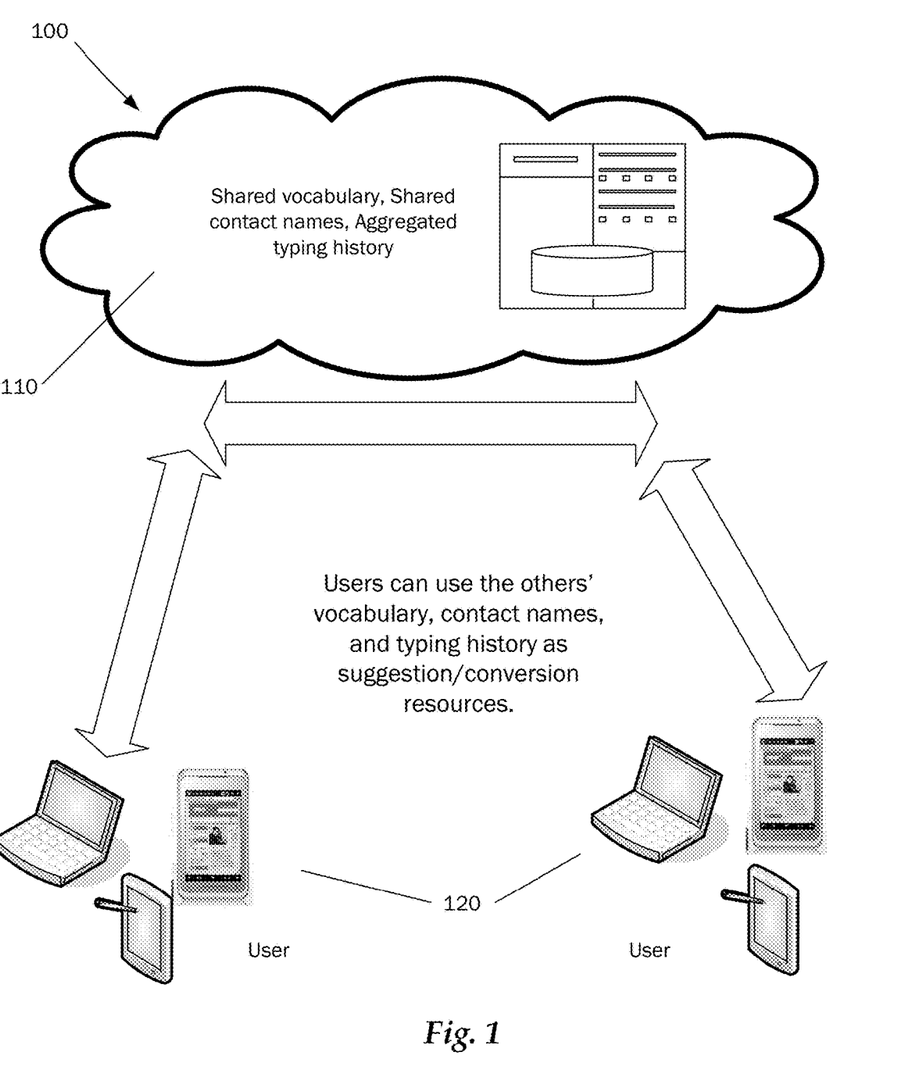
FIG. 1 provides a high level architecture of cloud based shared vocabulary/typing history for users according to one embodiment.

FIG. 1 provides a high level architecture of cloud based shared vocabulary/typing history for users 100 according to one embodiment. By leveraging the cloud service 110 to get other users shared vocabulary/typing history, a user can use this as suggestion/conversion resources for IME when typing in SNS in a communication session. For illustration purposes only, three sharing scenarios are addressed to provide insight for providing shared vocabulary/typing history for efficient social communication.

One-to-one sharing enables an IME to learn the aggregated typing history or vocabulary from another user. Afterwards, the two vocabularies are shared and synchronized in the messaging thread. This allows the IME to provide efficient communication even when new terms are used by one of the users.

MANY-TO-MANY sharing involve the IME learning vocabulary from shared typing history in the community, and then sharing the vocabulary with all community users. In a microblog, for example, many people share ideas and there may be common intricate terms or topics. Through sharing, the vocabulary grows quickly to include the 'hot topics' used during the thread. These terms may also be shared so that each IME can utilize the previous learning of the other IMEs.

In ONE-TO-MANY sharing, domain terms are shared with friends by providing a download link of their Web dictionary. The web dictionary is provided as part of the IME and may be thought of as a marketplace that people can build dictionaries since it is a dictionary format that is open to the public. Users and others, such as interested companies, may create more dictionaries after the release of an IME, and upload that web dictionary to a home page maintained at an accessible server. Interested users can download the new web dictionaries to make a richer dictionary vocabulary based on their local typing experience.

Using a hardware or virtual input device, when users 120 type only a partial pronunciation, the IME will provide a candidate list which includes the new term as a suggestion.

Then, when the full pronunciation is entered, the IME now knows the correct conversion for the term based on the previous use of the partial pronunciation. This enables a user's typing to be accurate and fast because IME uses shared typing history and shared vocabulary among friends to offer candidates of prediction and conversion. Users' input devices may include, but not limited to, desktop computers, laptops, mobile devices, handheld tablets, etc.

Figure 2:
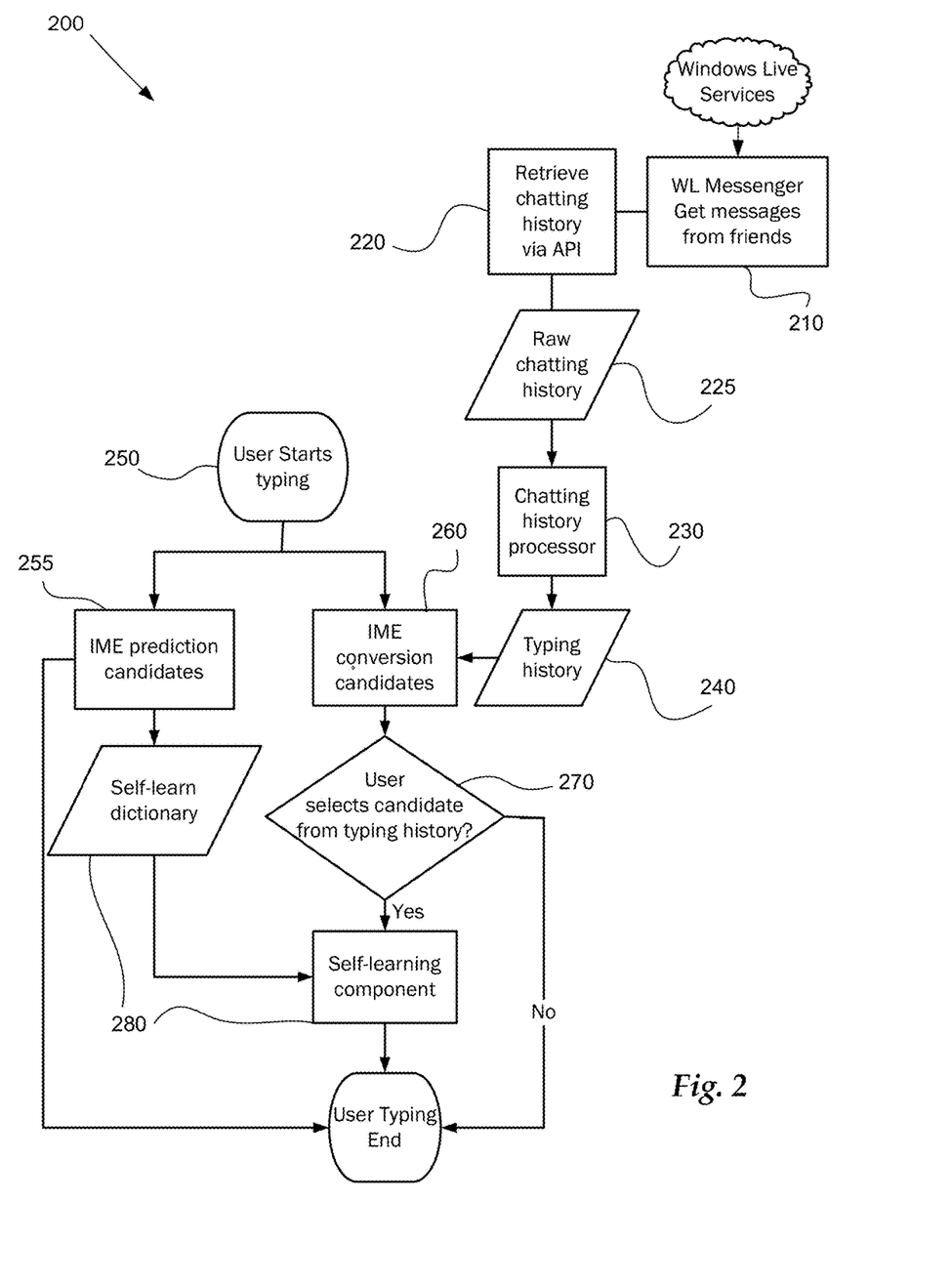
FIG. 2 provides a flowchart of the one-to-one sharing process according to one embodiment.

FIG. 2 provides a flowchart of the ONE-TO-ONE sharing process 200 according to one embodiment. This process 200 enables an IME to learn the vocabulary from another user through sharing the same typing history. East Asian Languages contain thousands of characters, obviously much more than a standard keyboard can contain. Since several characters may have the same pronunciation, the correct character is chosen from a list of possibilities, known as a candidate list. Often, the IME will choose a character automatically, based on context or on the user's previous choices. By learning from active aggregated typing history 240 and sharing vocabularies enhance this process. With instant messaging, for example, when a first user types the new term while chatting with the second user, the correct conversion is learned by the IME and shared with the second user. As a result, the second user may type the new term and the IME will recognize the new term and provide the correct conversion result. Thus, the second user does not have to go through the learning and error correction process again.

Accordingly, when two users are chatting in a messenger service, IME may retrieve the active chatting history of both users. Initially, the messenger service gets messages from friends 210 so others can see who is online, get social updates from friends, and start chatting. An IME retrieves chatting history via API 220, and inputs the raw chatting 225 to be processed 230 to provide aggregated typing history 240. When a user starts typing 250, IME supplies both prediction candidates 255 and conversion candidates 260 that are based on the aggregated typing history 240 on the candidate list. When the user confirms the conversion candidate from the candidate list 270, the new words will be entered in the user's learning data 280. Thus, both users can get the efficient input based on the learning processed based on the typing history 240.

Figure 3:
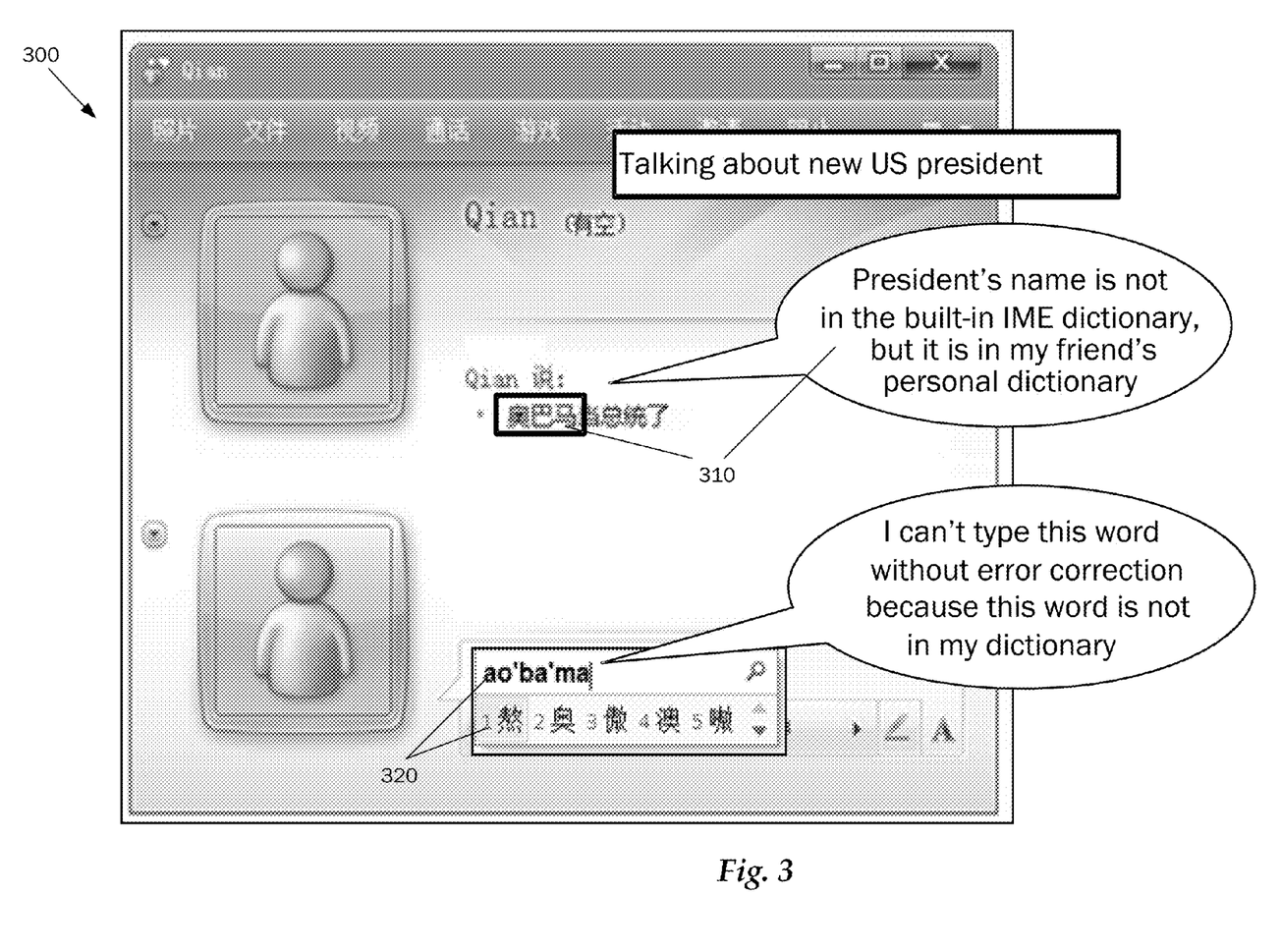
FIG. 3 illustrates the inability to correctly enter a desired word for lack of the word being in the user's dictionary according to one embodiment.

FIG. 3 illustrates the inability to correctly enter a desired word 300 according to one embodiment. In FIG. 3, the user cannot enter the desired word because that word is not in the user's dictionary. FIG. 3 shows that the user Qian is making reference to the US president 310. The president's name is not in the built-in IME dictionary or personal dictionary of the friend. It is however in Qian's personal dictionary. The friend cannot type this word without error correction; therefore, it is not in the candidate list 320.

Figure 4:
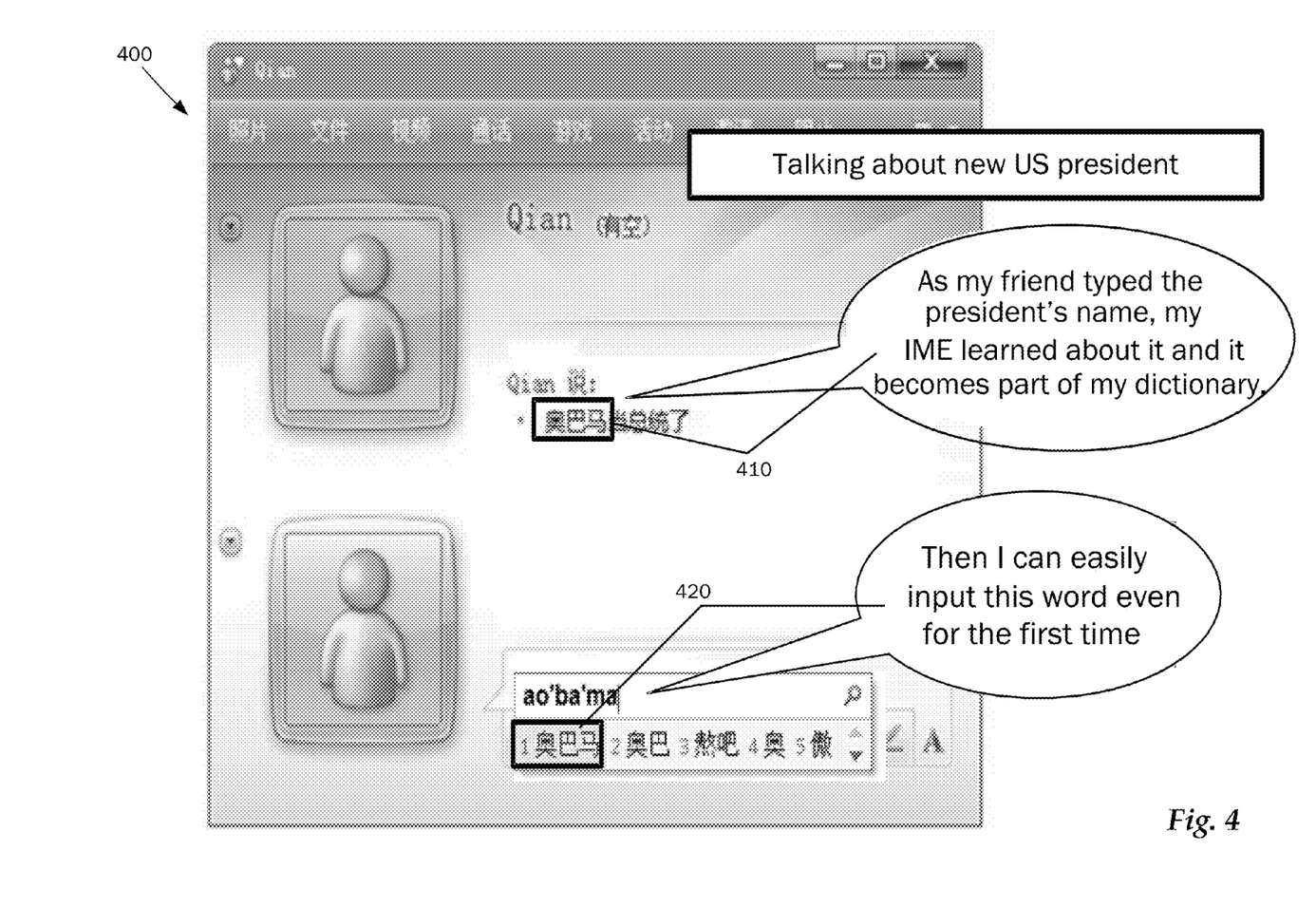
FIG. 4 illustrates correctly entering a desired word because of shared typing history according to one embodiment.

FIG. 4 illustrates correctly entering a desired word 400 because of shared typing history according to one embodiment. Now, when Qian is making reference to the US president 410, the friend IME may learn the word by sharing aggregated typing history. The friend can input the word correctly even for the first time as it displayed at the beginning of the candidate list 420.

Figure 5:
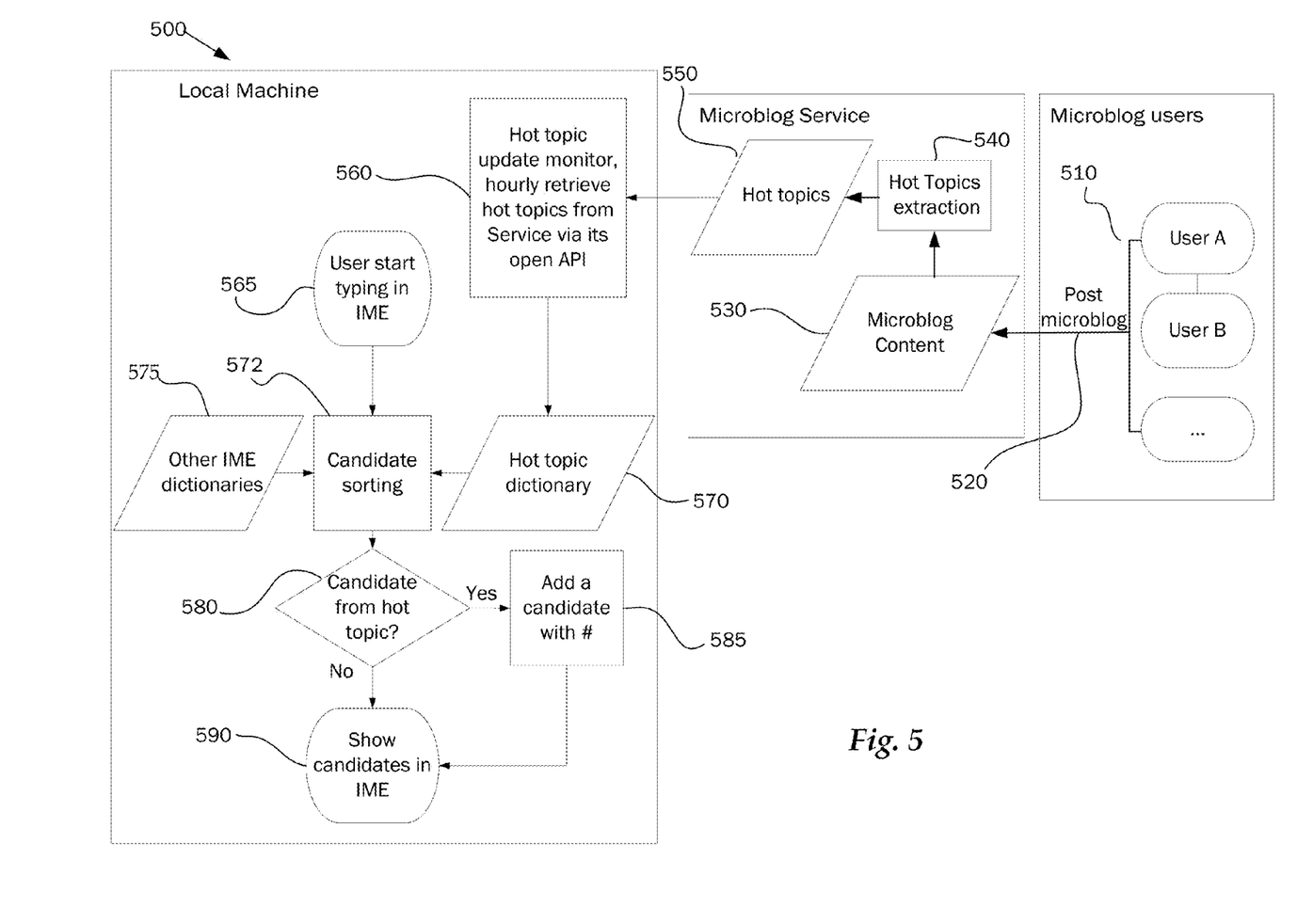
FIG. 5 provides a flowchart of the many-to-many sharing process according to one embodiment.

FIG. 5 provides a flowchart of the MANY-TO-MANY sharing process 500 according to one embodiment. The MANY-TO-MANY sharing scenario uses hot topics of interest on a Chinese microblog website as an example. Microblogs are typically small elements of content such as short sentences, individual images, or video links about various topics. There are numerous users 510 posting microblog entries every day, every minute. After bloggers post their input to the service 520, processing is performed on the blog content 530. The real-time service then extracts the hot topics 540 from what users have entered, e.g., periodically, every hour, every day or every week. IME will retrieve these shared hot topics 550 from the microblog cloud service via an open application programming interface (API) 560 used by the microblog. The IME will then provide the conversion candidate selections in the IME candidate list 572 from the hot topic dictionary 570 when users contribute to a blog using IME.

Thus, when a user starts typing 565, the IME will know which hot topics other users 510 are using. Then, the IME can convert these hot topics collaterally 580. In addition to hot topics dictionary 570, the IME may also predict the user's friend names in the candidate list 572. Many other dictionaries 575 may also be utilized in the local IME for prediction candidates. For example, there may be different domain dictionaries 575, many personal dictionaries 575, as well as the hot topic dictionary 570. IME will use all these dictionaries to generate the prediction and the conversion candidate results. If the candidate is from a hot topic 580, a mark, e.g., "#," can be automatically added to improve interaction 585 before IME shows the candidate 590.

Figure 6:
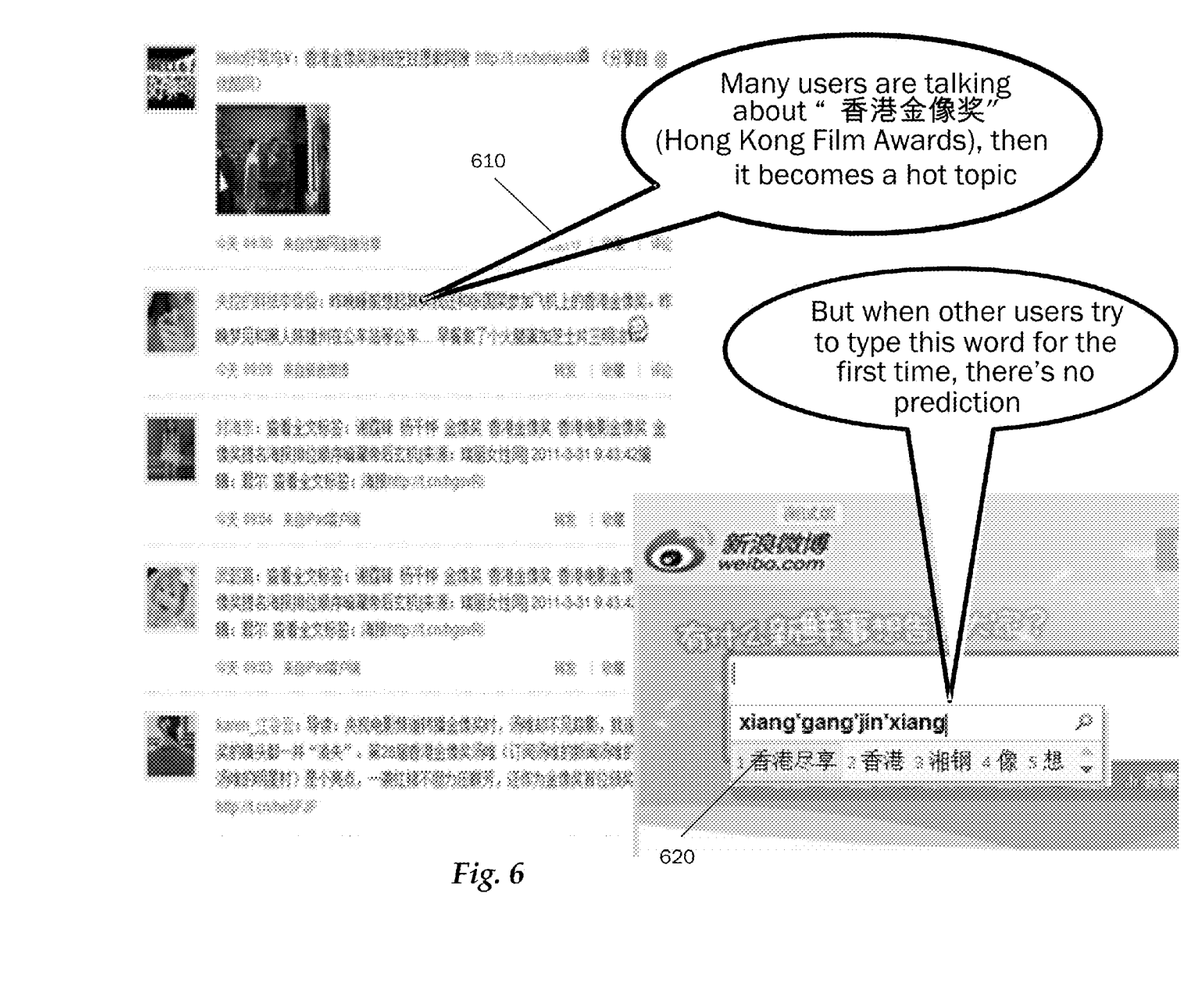
FIG. 6 illustrates typing in a hot topic without the shared hot topic dictionary according to one embodiment.

FIG. 6 illustrates typing in a hot topic without the shared hot topic dictionary 600 according to one embodiment. When many users comment about the same event, person, or place for example, it becomes a hot topic 610. IME does not recognize these words, therefore when other users try to type the word for the first time, there is no prediction in the candidate list 620.

Figure 7:
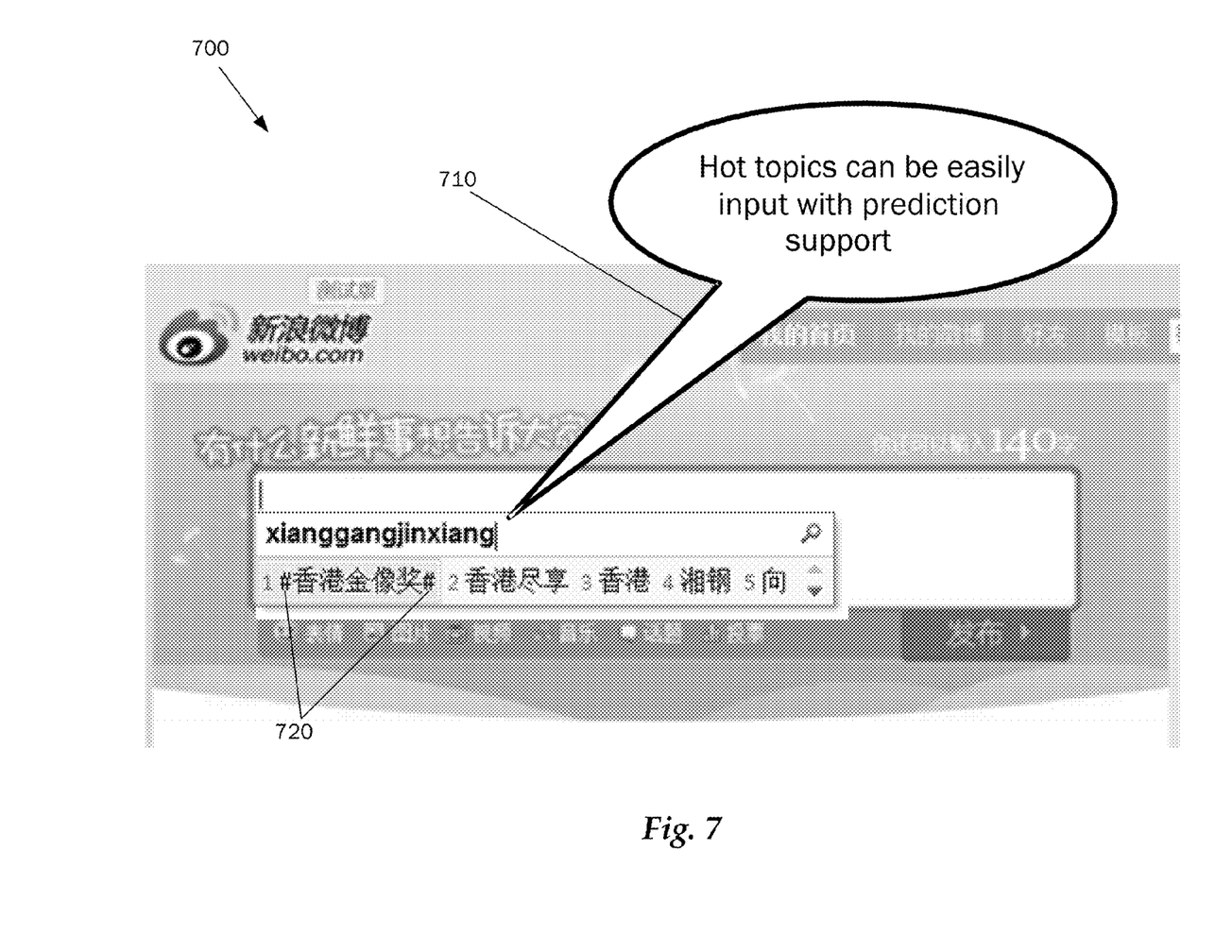
FIG. 7 illustrates typing in a hot topic with a shared hot topic dictionary according to one embodiment.

FIG. 7 illustrates typing in a hot topic with a shared hot topic dictionary 700 according to one embodiment. Users can easily input hot topics with prediction support 710 the first time it is typed. The candidate is tagged with '#' 720 to label it as a hot topic.

Figure 8:
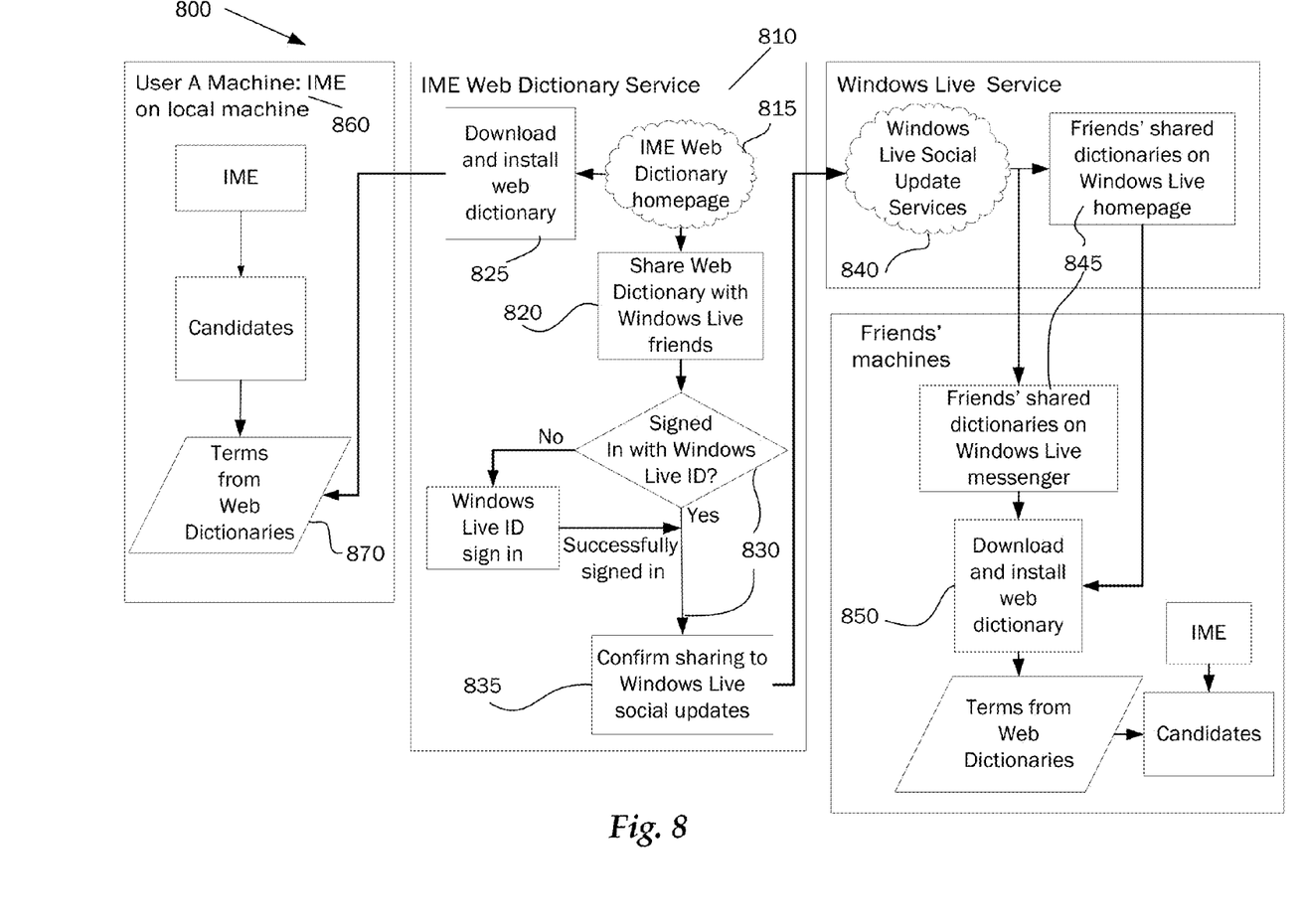
FIG. 8 provides a flowchart of the one-to-many sharing process according to one embodiment.

FIG. 8 provides a flowchart of the ONE-TO-MANY sharing process 800 according to one embodiment. This third example involves the sharing of web dictionaries with friends. The web dictionary is provided as part of the IME and may be thought of as a marketplace that people can build dictionaries since it is a dictionary format that is open to the public. Users and others, such as interested companies, may create more dictionaries after the release of an IME, and upload that web dictionary to a home page maintained at an accessible server. Interested users can download the new web dictionaries to make a richer dictionary vocabulary based on their local typing experience.

IME Web Dictionary Service 810 may provide a web dictionary homepage 815 on a web site. When User A 860 downloads and installs 825 a web dictionary (terms) 870, then User A may share this action and web dictionary link with friends in WINDOWS LIVE social update service 840. Friends see the web dictionary link in WINDOWS LIVE service 845, and then may activate the web dictionary link to install the web dictionary 850 on their machines. The friends may also share the same terms among other friends. A share button may be provided on the web site that allows users to share 820 the web dictionary link with their friends, e.g., through WINDOWS LIVE social update service 840. The user signs-in 830 in order to post a social update on their WINDOWS LIVE social update service 840. Once the user selects to share with friends 835, the friends will see that there are new updates in WINDOWS LIVE service 845. For example, the link may indicate that the user recommends or likes a dictionary. Then, if the friends are interested, they can click that link and install this web dictionary 850. Thus, the WINDOWS LIVE network is used to help build more web dictionaries created either by users or others, which in turn leads to a broader audience.

Figure 9:
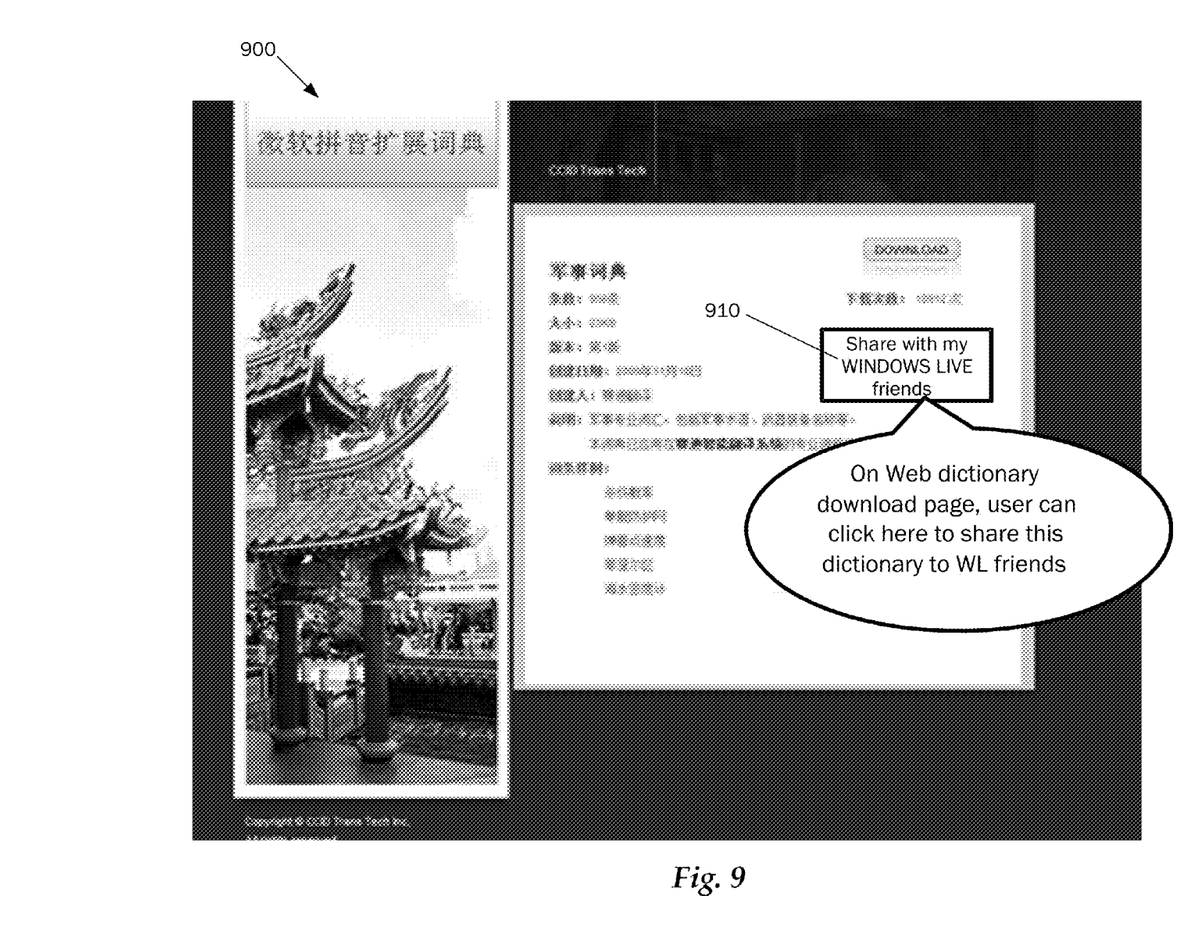
FIG. 9 illustrates the IME Web dictionary download homepage according to one embodiment.

FIG. 9 illustrates the IME web dictionary download homepage 900 according to one embodiment. On the Web dictionary download page, the user can click the box 910 to share the dictionary to WINDOWS LIVE friends.

Figure 10:
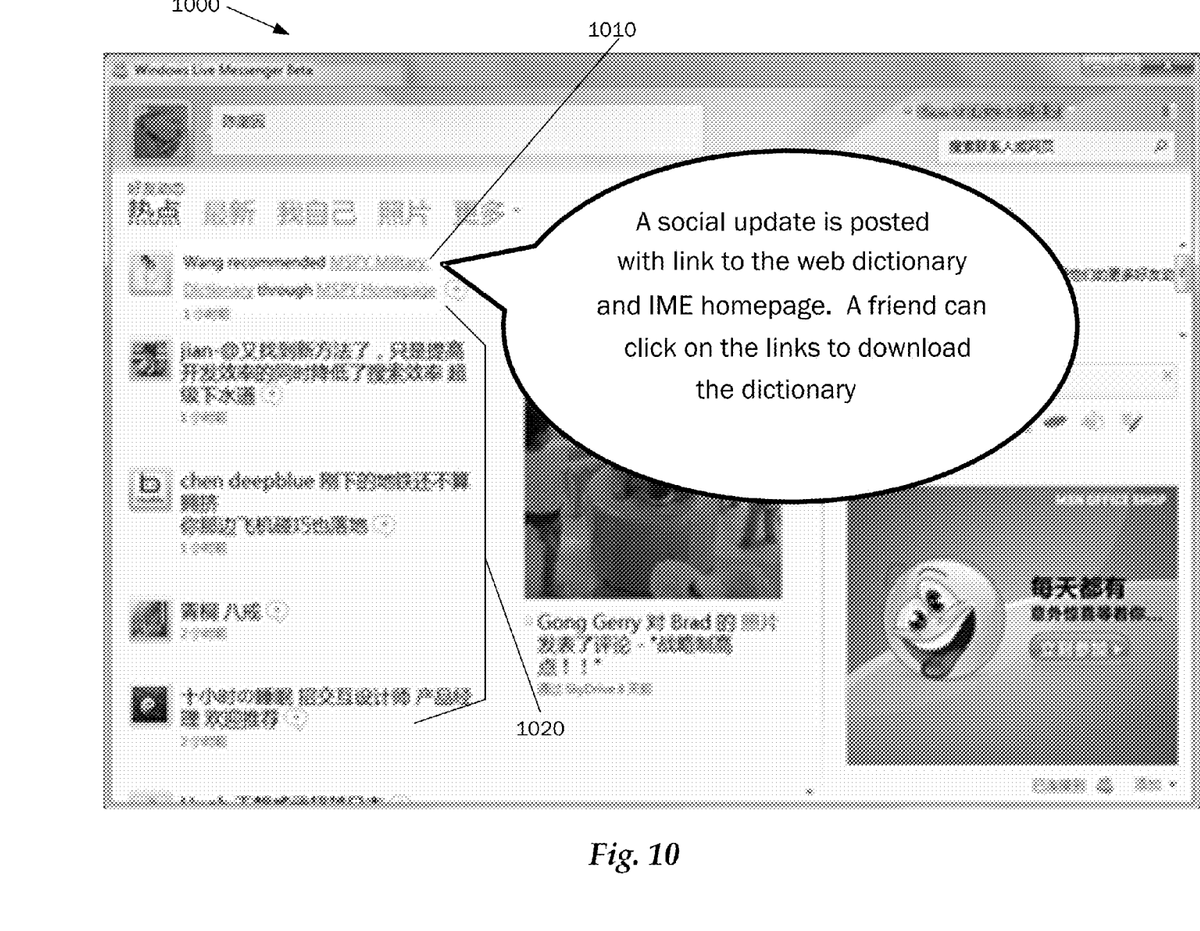
FIG. 10 shows a social update posting the link to the web dictionary and IME homepage according to one embodiment.

FIG. 10 shows a social update posting the link to the web dictionary and IME homepage 1000 according to one embodiment. A friend can click on the links 1010 from one of the social update postings 1020 to download the dictionary.

Figure 11:
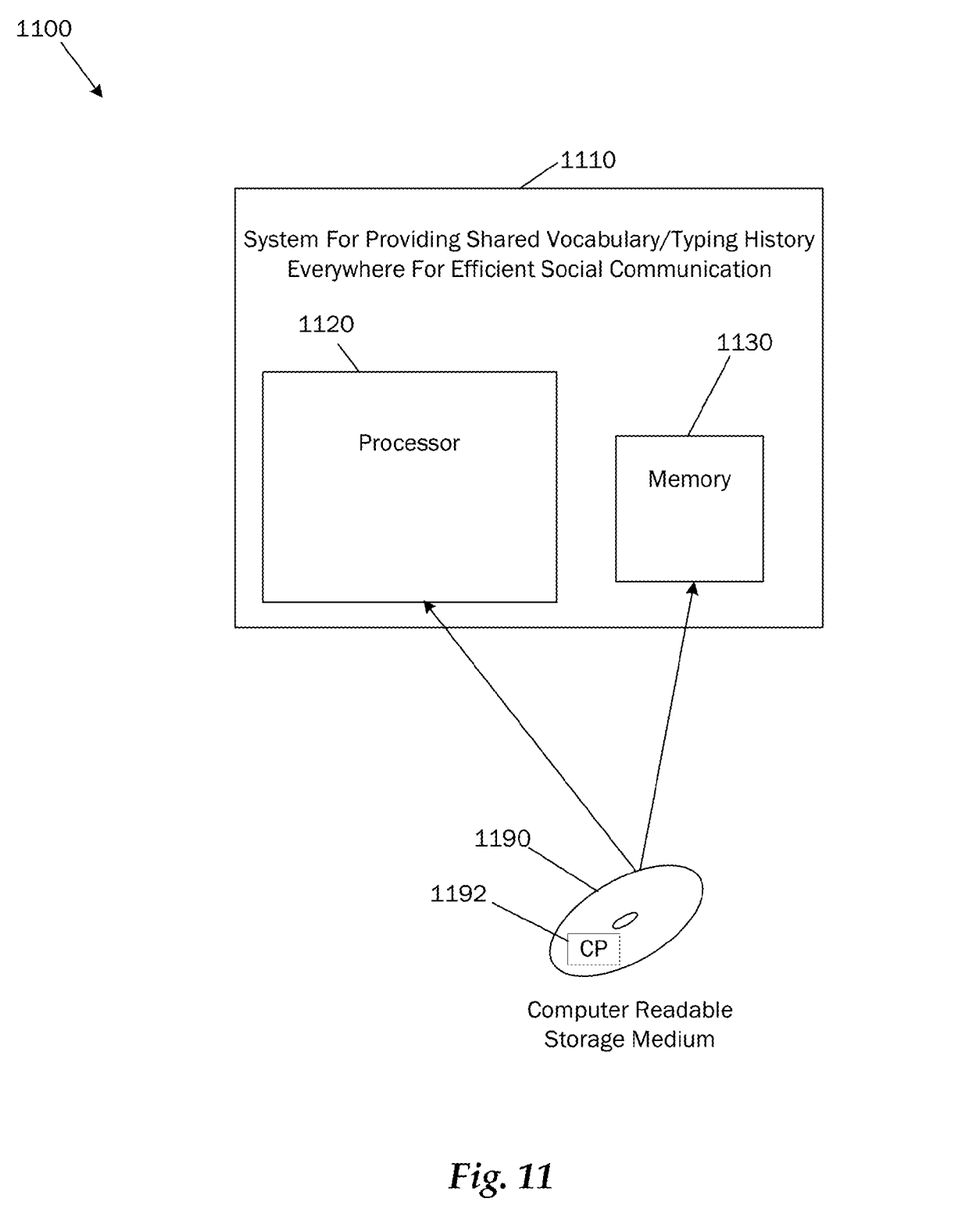
FIG. 11 illustrates a suitable computing environment for implementing a system as described above in FIGS. 1-10 according to an embodiment.

FIG. 11 illustrates a suitable computing environment 1100 for implementing a system as described above in FIGS. 1-10 according to an embodiment. In FIG. 11, a system for providing shared vocabulary/typing history 1110 includes a processor 1120 and memory 1130. Those skilled in the art will recognize that the system for providing shared vocabulary/typing history 1110 may be implemented in a central module, a resource manager, and other data or content devices. Embodiments may also be implemented in combination with other types of computer systems and program modules. Generally, program modules include applications, routines, programs, components, data structures, and other types of structures that perform particular tasks or implement particular abstract data types. By way of example, computer readable media 1190 can include computer storage media or other tangible media. Computer storage media 1190 includes volatile and nonvolatile, removable and non-removable media implemented in any method or technology for storage of information 1192, such as computer readable instructions, data structures, program modules or other data. Moreover, those skilled in the art will appreciate that other computer system configurations may be implemented, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 1190 may refer to a mass storage device, such as a hard disk or CD-ROM drive. However, those skilled in the art will recognize that tangible computer-readable media can be any available media that can be accessed or utilized by a processing device, e.g., server or communications network provider infrastructure.

By way of example, and not limitation, computer-readable media 1190 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processors 1120 may be configured to execute instructions that perform the operations of embodiments. It should also be appreciated that various embodiments can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of embodiments as recited within the claims set forth herein.

Memory 1130 thus may store the computer-executable instructions that, when executed by processor 1120, cause the processor 1120 to implement shared vocabulary/typing history everywhere for efficient social communication according to an embodiment as described above with reference to FIGS. 1-10. Memory 1130 may also be used to store input history, user profiles and learned data for users.

The foregoing description of the embodiments has been presented for the purposes of illustration and description. It is not intended to be exhaustive or to limit the embodiments to the precise form disclosed. Many modifications and variations are possible in light of the above teaching. It is intended that the scope of the embodiments be limited not with this detailed description, but rather by the claims appended hereto.

What is claimed is:

1. A communication device, comprising:
   a personal dictionary associated with a first user of the communication device;
   memory for storing data associated with the first user of the communication device; and
   a processor, coupled to the memory, the processor configured for:
   receiving input data from at least the first user of the communication device during a conversation with a second user with another communication device, wherein the input data comprises a term not yet included in either of the personal dictionary of the first user and a personal dictionary of the second user;
   during the same conversation, generating prediction candidates for the first user for converting the received input data from the first user on the communication device of the first user;
   updating the personal dictionary of the first user as a result of the first user confirming one or more of the prediction candidates during the same conversation; and
   sharing updates from the personal dictionary of the first user with the other communication device of the second user during the same conversation such that when the second user subsequently enters input data during the same conversation on the other communication device the second user's input data is automatically changed using entries in the personal dictionary of the second user that have been updated automatically during the same conversation based on the prediction candidate confirmed by the first user shared during the same conversation from the personal dictionary of the first user.

2. The communication device of claim 1, further comprising an input method editor server having memory for storing input history, user profiles and learned data for users.

3. The communication device of claim 2, wherein the processor identifies users associated with a communication session, and wherein the information provided to the input method editor server comprises input history of each user associated with the communication session.

4. The communication device of claim 3, wherein the processor aggregates the retrieved input history of each user associated with the communication session to form an aggregated input history and provides the aggregated input history to the processor of the at least first user to generate the prediction candidates during the communication session.

5. The communication device of claim 1, further comprising a microblog server having memory for storing data associated with blogger input.

6. The communication device of claim 5, wherein the processor stores the information provided to the microblog server and updates a microblog hot topic dictionary.

7. The communication device of claim 6, wherein the microblog server extracts hot topics and provides the extracted hot topics to an open interface for retrieval by the first user for generating the hot topic dictionary.

8. A system for sharing between friends a dictionary used to generate prediction candidates for converting user input data to language characters, comprising:
　a first user device for receiving input data from a first user; and
　a second user device for receiving input data from a second user, wherein the first and second users are communicating with one another during a conversation, wherein the input data comprises a term not yet included in either of a personal dictionary of the first user and a persona dictionary of the second user;
　wherein input data received in the first user device from the first user generates prediction candidates for converting the input data received in the first user device from the first user, the personal dictionary of the first user is updated as a result of the first user confirming one or more of the prediction candidates, and wherein the one or more prediction candidates that are confirmed by the first user are shared with the second user device of the second user during the same conversation such that during the same conversation input data received from the second user on the second user device is automatically changed during the same conversation using entries in the personal dictionary of the second user having been updated based on the shared one or more prediction candidates confirmed by the first user.

9. The system of claim 8, wherein first user device initiates a communication session with the second user device, and wherein the dictionary shared by at least the first user and the second user includes an aggregate of input history associated with at least the first user and the second user.

10. A computer-readable storage device including executable instructions which, when executed by a processor, provides shared data for efficient social communication, by:
　receiving input data from at least a first user of a communication device during a conversation with a second user of another communication device, wherein the input data comprises a term not yet included in either of a personal dictionary of the first user and a personal dictionary of the second user;
　during the same conversation, generating prediction candidates for the first user for converting the received input data from the first user on the communication device of the first user;
　updating the personal dictionary of the first user as a result of the first user confirming one or more of the prediction candidates during the same conversation; and
　sharing updates from the personal dictionary of the first user with the other communication device of the second user during the same conversation such that when the second user subsequently enters input data during the same conversation on the other communication device the input data is automatically changed using entries in the personal dictionary of the second user that have been updated automatically during the same conversation based on the prediction candidate confirmed by the first user shared during the same conversation from the personal dictionary of the first user.

11. A method for providing shared data for efficient social communication, comprising:
　receiving input data from at least a first user of the communication device during a conversation with a second user of another communication device; wherein the input data comprises a term not yet included in either of a personal dictionary of the first user and a personal dictionary of the second user;
　during the same conversation, generating prediction candidates for the first user for converting the received input data from the first user on the communication device of the first user;
　updating the personal dictionary of the first user as a result of the first user confirming one or more of the prediction candidates during the same conversation; and
　sharing updates from the personal dictionary of the first user with the other communication device of the second user during the same conversation such that when the second user subsequently enters input data during the same conversation on the other communication device the second user's input data s automatically changed using entries in the personal dictionary of the second user that have been updated automatically based on the prediction candidate confirmed by the first user shared during the same conversation from the personal dictionary of the first user.

\* \* \* \* \*